C. B. SCHOENMAN & R. M. HOUCK.
FUSING TOOL.
APPLICATION FILED JAN. 4, 1917.
1,259,141.
Patented Mar. 12, 1918.
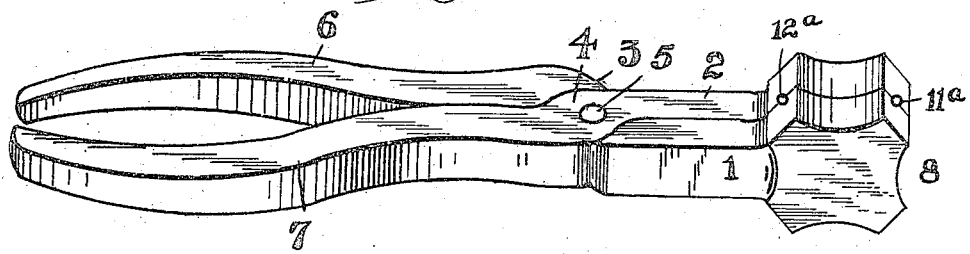
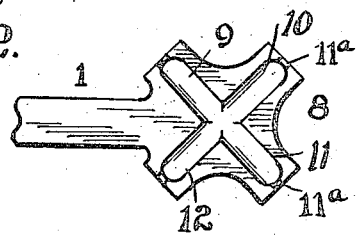
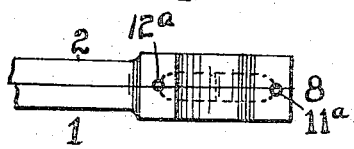
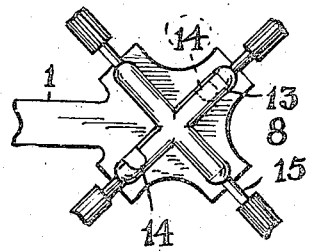
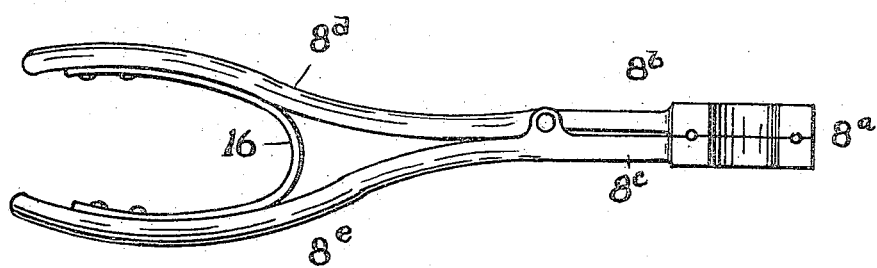
WITNESS
R. F. Dilworth
B. E. Jenkins
INVENTORS
Charles B. Schoenman
and Ralph M. Houck
By Max H. Srolovitz
his attorney

UNITED STATES PATENT OFFICE.

CHARLES B. SCHOENMAN, OF WILKINSBURG, AND RALPH M. HOUCK, OF SWISSVALE, PENNSYLVANIA.

FUSING-TOOL.

1,259,141.  Specification of Letters Patent.  Patented Mar. 12, 1918.

Application filed January 4, 1917. Serial No. 140,515.

*To all whom it may concern:*

Be it known that we, CHARLES B. SCHOENMAN and RALPH M. HOUCK, citizens of the United States of America, residing at Wilkinsburg and Swissvale, county of Allegheny, and State of Pennsylvania, have invented certain new and useful Improvements in Fusing-Tools, of which the following is a specification.

This invention relates to a fusing tool, designed primarily for fusing together the elements forming joint connections for electrical conductors as disclosed in our application, Serial Number 119,334, filed September 11th, 1916, and for other purposes wherein it is found applicable, and has for its object to provide a tool of such class, in a manner as hereinafter set forth, which is simple in its construction and arrangement, strong, durable, efficient and convenient in its use, and inexpensive to manufacture.

With the foregoing and other objects in view the invention consists of the novel construction, combination and arrangement of parts, as hereinafter more specifically described and illustrated in the accompanying drawing, wherein is found an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a fusing tool in accordance with this invention.

Fig. 2 is a plan of one of the fusing heads.

Fig. 3 is a side elevation of a fusing head.

Fig. 4 is a plan view illustrating the elements of a joint mounted in one of the fusing heads.

Fig. 5 is a sectional elevation showing a modified form of handle.

Referring to the drawings in detail 1 and 2 denote a pair of shanks, and each of said shanks has an angular portion, that for the shank 1 is indicated at 3 and for the shank 2 at 4. The angular portions 3, 4, are pivotally connected, as at 5. Formed integral with the angular portion 3 of the shank 1 is a handle 6, which opposes a handle 7 formed integral with the angular portion 4 of the shank 2.

Formed integral with each of said shanks is a soldering head 8 of cruciform shape. Each head 8 is disposed centrally with respect to its associated shank and the inner face of each head is provided with a cruciform shape concavity the branches or legs of which are indicated at 9, 10, 11 and 12. Each leg of the concavity is formed from a semi-circular groove having a rounded outer terminus and the said grooves merge into each other at their entire termina at the center of the head. Each of said legs of a concavity terminates at a point removed from the edge of the head and said head has its inner face formed with a series of small grooves $11^a$, each of which starts at the edge of the head and opens into the outer end of a leg.

When the heads 8 are moved to the position shown in Fig. 1, the grooves $11^a$ register to provide ports $12^a$.

The concavities in the heads 8 are of a depth to receive the sectional elements of a joint, as indicated at 13, in Fig. 4 whereby when the heads are brought together the sections of the joint are fused together. The sections of the joint are temporarily connected together by oppositely disposed lugs 14.

Each of the heads 8 is illustrated as an X-shaped concavity yet it is to be understood that the concavities can be of any form corresponding to the shape of the joint.

The X-shaped concavity enables the tool to be employed for four-way or cruciform joints, T-joints, L-joints and straight-joints.

The conductors which are connected together by the sections which constitute the joint are indicated at 15.

In the modified form shown in Fig. 5, the construction is similar to that as shown in Fig. 1, with this exception that the shanks $8^c$ and $8^b$ do not extend through each other as the shanks 1 and 2. The shanks $8^c$ and $8^b$ are pivotally connected together and the former terminates in a handle $8^d$ and the shank $8^c$ in a handle $8^e$. Arranged between the handles $8^e$ and $8^d$, as well as being secured thereto, is a spring 16, normally maintaining the heads $8^a$ in abutting engagement.

The fusing tool, when used, is heated similar to a so called copper soldering iron, then after sufficiently heated, it is placed over the joints which have already been positioned on the wire, the application of a hot tool will fuse the joints together and on to the wire. The tool, when fusing the sections of the joints, is retained on the sections a sufficient length of time so that the sections of the joint will become thoroughly fused together.

When the sections of the joint are positioned on the wire or conductor they are detachably connected together by the bendable lugs, as disclosed in our application No. 119,334, filed September 11th, 1916. The bendable lugs temporarily maintain the sections of the joint in position, until the application of the fusing heads.

What we claim is:—

1. A hand fusing tool for connected sections of a joint for electrical conductors comprising a pair of independently shiftable flat fusing heads adapted when heated to be positioned to inclose the joint sections when detachably secured together on the conductor for fusing said sections together to form a joint, shanks projecting in from said heads for independently shifting them, and each of said heads having its inner face formed with a cruciform shape concavity and a plurality of grooves, each groove extending through the outer end of a branch of the concavity to the edge of its respective head, each branch and groove being semicircular in cross section.

2. A hand fusing tool for connected sections of a joint for electrical conductors comprising a pair of independently shiftable flat fusing heads adapted when heated to be positioned to inclose the joint sections when detachably secured together on the conductor for fusing said sections together to form a joint, shanks projecting in from said heads for independently shifting them, and each of said heads having its inner face formed with a cruciform shape concavity and a plurality of grooves, each groove extending through the outer end of a branch of the concavity to the edge of its respective head, each branch and groove being semicircular in cross-section, and each branch having its outer terminus rounded.

In testimony whereof we affix our signatures in the presence of two witnesses.

CHARLES B. SCHOENMAN.
RALPH M. HOUCK.

Witnesses:
 LUELLA H. SIMON,
 HARRY J. KINGLER.

Copies of this patent may be obtained for five cents each, by addressing the "Commissioner of Patents, Washington, D. C."